United States Patent [19]

Mercier

[11] 4,429,718

[45] Feb. 7, 1984

[54] PRESSURE RESISTANT ACCUMULATOR DEVICE

[75] Inventor: Jacques H. Mercier, New York, N.Y.

[73] Assignee: The Normand Trust, New York, N.Y.

[21] Appl. No.: 401,863

[22] Filed: Jul. 26, 1982

[51] Int. Cl.³ .......................... F16L 55/04

[52] U.S. Cl. .......................... 138/30; 220/85 B

[58] Field of Search .......................... 138/26, 30, 31; 220/85 B, 67, 460, 461; 228/184, 154

[56] References Cited

U.S. PATENT DOCUMENTS

| | | | |
|---|---|---|---|
| 1,901,201 | 3/1933 | Taylor | 228/154 |
| 3,195,576 | 7/1965 | Mercier | 138/30 |
| 3,500,866 | 3/1970 | Greer | 138/30 |
| 4,288,894 | 9/1981 | Jacobellis | 138/30 X |

FOREIGN PATENT DOCUMENTS

| | | | |
|---|---|---|---|
| 2409736 | 9/1975 | Fed. Rep. of Germany | 138/30 |

*Primary Examiner*—Stephen Marcus
*Assistant Examiner*—Mark Thronson
*Attorney, Agent, or Firm*—Arthur B. Colvin

[57] ABSTRACT

The present invention is directed to an accumulator device and method of making the same. The pressure vessel in accordance with the invention includes a shell portion having an open mouth and a cap member affixed over the open mouth after a bladder assembly has been secured within the shell portion of the pressure vessel. A characterizing feature of the invention resides in the provision of an exterior annular weld connecting the cap member to the outer wall portion of the vessel as well as an interior weld connection between the interior wall portion of the cap member and the upwardly directed end edge of the mouth of the pressure vessel. A further characterizing feature of the invention resides in the utilization of a metallic skirt member which functions to support the bladder and to define with the inner wall surface of the cap member an annular trough containing the weld which secures the cap member interior to the uppermost edge of the pressure vessel, whereby the possibility of weld fragments falling into the bladder causing damage the latter is minimized.

The invention is further directed to a novel method of manufacturing an accumulator device of the type described wherein the interior weld between the cap member and pressure vessel end face is effected by welding mechanism inserted through the opening in the cap member which will ultimately be used to support the gas charging valve assembly.

4 Claims, 3 Drawing Figures

PRESSURE RESISTANT ACCUMULATOR DEVICE

BACKGROUND OF THE INVENTION

1. Field of the Invention

The present invention is in the field of accumulator devices and relates more particularly to an accumulator device which comprises a pressure vessel having an oil port at its lower end, a cap member at its upper end, a gas charging valve assembly mounted in the cap member and an interior bladder assembly, which divides the vessel into two chambers in communication respectively with the oil port and the gas charging valve assembly.

2. The Prior Art

With the progressively increasing use of hydraulic accumulator devices for energy storage and for pulsation dampening as well as other uses, increasing emphasis has been placed upon constructing such accumulators in a manner in which they may be economically manufactured and yet provide a high degree of resistance to the pressures to which they are subjected in use. Known accumulators can be manufactured by a procedure which involves forming threaded connections on the pressure vessel and on the cap member used to close one end thereof. Such devices after assembly and with the introduction between the assembled parts of appropriate O-rings or like gasketing are capable of withstanding high pressures without danger of axial separation of the cap from the pressure vessel. However, it will be readily recognized that the operation of forming the pressure vessel and the cap as by a forging operation and subsequently machining the necessary threaded connections on the noted components is an extremely costly one limiting the range of uses with which the accumulator may be economically employed.

Numerous means have been suggested for effectively uniting the cap member over the open end of the pressure vessel to effect a pressure resistant connection between such parts. Such means have included rolling steps wherein the metal of the components are deformed into an interlocking engagement. By way of example, of a means of connecting such components by rolling or spinning, reference is made to U.S. Pat. No. 4,280,533. As will be readily understood by those skilled in the metal forming art however, rolling or spinning to define sharp bends or interconnections is limited to metals of relatively small thickness and thus accumulators formed in such manner are not suited to high pressure operation. Additionally, the roll forming of metals about sharp bend lines often effects crystalization of the metals in the deformed areas with resultant weakening of the metallic structures.

A further method in common use for connecting the cap components of an accumulator to the pressure vessel component involves an assembling of the noted parts and the formation of a weld between the outer wall portion of the vessel and the downwardly directed surface of the cap. However, in high pressure operations, the weld connection particularly at its interface with the outer wall portions of the pressure vessel has been known to shear or separate with resultant leakage, and under extreme conditions, the cap may be blown clear of its connection to the pressure vessel.

SUMMARY OF THE INVENTION

The present invention may be summarized as directed to an improved accumulator device and method of making same characterized in that the components of the accumulator namely, the pressure vessel, the bladder assembly and the cap member are interconnected by a series of three annular welds. Importantly, to the resistance of the assembly to radial and axial forces resulting from the high pressure, two of such welds are effected between the cap member and pressure vessel, one being the essentially conventional exterior weld and another being a continuous annular interior weld between the upper edge of the vessel and interior side wall portion of the cap. Such construction provides a far higher degree of radial and axial pressure resistance than the conventional single exterior weld construction.

An important aspect of the invention resides in the provision of a mounting skirt weldingly connected to the interior of the pressure vessel and utilized as the support for the bladder assembly. Such mounting skirts are known per se. However, in accordance with the instant invention the uppermost end of the skirt is caused to extend a distance above the open mouth portion of the pressure vessel, whereby there is defined between the interior surface of the cap and the upwardly extending end portion of the skirt of the bladder assembly, an annular trough for the formation of the interior weld. The provision of such trough acts to prevent the flow of weld material into the interior of the bladder with resultant damage or destruction of the bladder.

The invention is further directed to a novel method of manufacturing a high pressure resistant vessel in accordance with which method access to the weld area formed interiorly of the device is effected through the aperture in the cap which will support the gas charging valve assembly.

In accordance with a further aspect of the method the cap member may be applied in an initially cylindrical configuration of wall thickness preferably substantially close to the wall thickness of the pressure vessel and thereafter spun or formed into the part hemispherical configuration typically employed in accumulator devices. It is to be noted that the formation by spinning or rolling does not require the production of any sharp bends whereby such operation is suitable for use with thick walled materials and does not result in metal crystalization problems.

It is accordingly an object of the invention to provide a novel high pressure resistant accumulator device.

A further object of the invention is the provision of an accumulator device of the type described wherein a cap member, which will carry the gas charging valve assembly, is secured to the pressure vessel by two annular weld connections thus greatly increasing the resistance to separation of the cap from the vessel and hence increasing the pressure capability thereof.

Still a further object of the invention is the provision of a method of manufacturing a high pressure resistant hydraulic accumulator device which includes the step of effecting an interior weld between the cap member and the upper end of the pressure vessel, such interior weld being effected through an opening in the cap member which ultimately carries the gas charging valve assembly.

Still a further object of the invention is the provision of a method of making an accumulator device as described which includes the step of forming the cap member to its end configuration after the cap has been weldingly connected by both an interior and exterior weld to the body of the pressure vessel.

In order to attain these objects and such other objects as may be hereinafter pointed out reference is made to the accompanying drawings in which.

Figure 1:
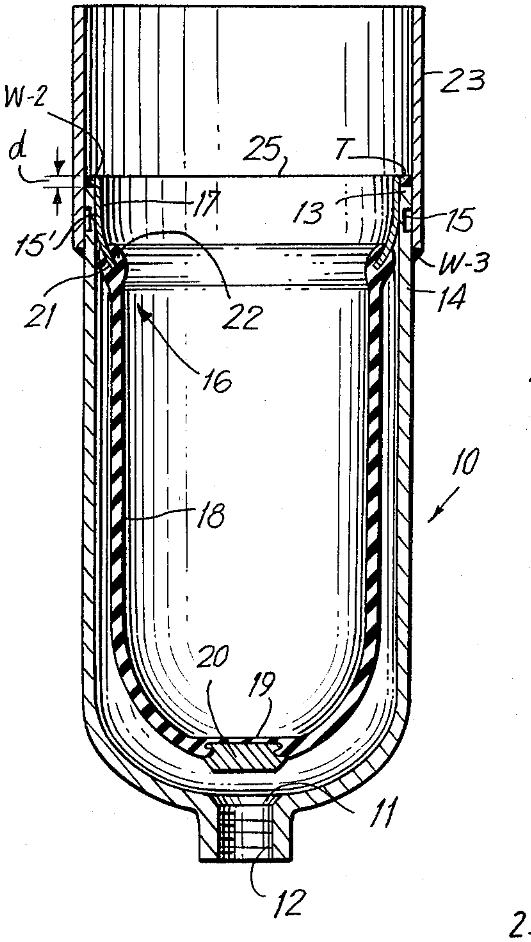
FIG. 1 is a vertical sectional view through a pressure vessel in accordance with the invention in a partly finished condition.

Referring now to the drawings there is shown in FIG. 1 a partially finished accumulator device which includes a pressure vessel 10 having an oil port 11 at its lower end, an internally threaded nipple 12 being provided to enable the vessel to be connected to the hydraulic line of a system incorporating the accumulator.

The pressure vessel 10 includes an open mouth portion defined by the upwardly directed end face or upper edge 13 of the pressure vessel. Preferably, the exterior wall portion 14 of the pressure vessel includes an annular groove of recess 15 adjacent the upper end of the vessel for purposes which will appear hereinafter.

The device includes a bladder assembly 16, said assembly including a retainer member or skirt of metallic material 17 on which is supported a elastomeric bladder member 18. The bladder member 18 may include at its lower end 19, a rigid button 20 known per se, which button functions in the distended condition of the bladder to seat against the oil port 11 and seal the same. The skirt 17 may include inwardly directed flange 21 on which is mounted by a combined bonding and adhesion process, a thickened rim portion 22 of the bladder.

Figure 2:
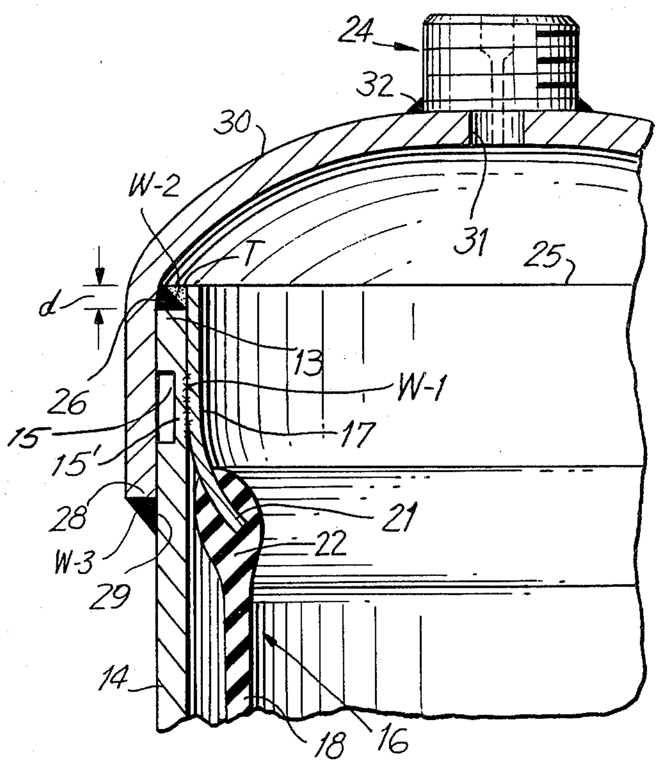
FIG. 2 is a magnified fragmentary section of the pressure vessel of FIG. 1 in finished condition.

The accumulator device includes a cap member or sub-assembly 23 which will ultimately carry the gas charging valve assembly 24 (see FIG. 2).

There will now be described the sequence of steps employed to convert or assemble the elements hereinabove described to the finished accumulator assembly illustrated in FIG. 2. As an initial step, the bladder assembly 16 is inserted through the open mouth or end 13 of the pressure vessel in such manner that the uppermost edge 25 of the skirt 17 extends a short distance "d" above the level of the upper edge 13 of the pressure vessel. With the skirt 17 thus positioned relative to the pressure vessel, an annular resistance weld W-1 is formed between the skirt 17 and the vessel in the area in registry with the groove 15 of the pressure vessel. The purpose of providing the groove or recess 15 is to leave a relatively thin metal wall section 15' in the pressure vessel. Preferably the thickness of the wall portion 15' of the pressure vessel aligned with the groove 15 is substantially identical of the wall thickness of the skirt 17 to facilitate the formation of a resistance weld.

After the bladder assembly 16 has been connected to the vessel 10, the cap member 23 is sleeved over the end 13 of the vessel to the position shown in FIGS. 1 and 2. With the parts positioned as shown, a second continuous annular weld W-2 is effected between the upper edge 13 of the pressure vessel and the interior wall portion 26 of the cap assembly 23.

As will be apparent from an inspection of FIGS. 1 and 2, by virtue of the upper end 25 of the skirt extending above the edge 13 of the pressure vessel, there is defined between the cap 23 and the skirt 17 an annular trough T for reception of the weld W-2. This trough assures that debris from the formation of the weld W-2 will not fall into the interior of the bladder with possible consequent damage either immediately from burning or subsequently from the presence of metallic particles. Optionally, and as a further precaution against damage to the bladder, the same may be filled with water during formation of the weld W-2.

Finally, the weld W-3 is formed, the same being a continuous annular weld which links the downwardly directed edge 28 of the cap 23 with the exterior wall portion 29 of the pressure vessel 10. It will be understood that the sequence of formation of the welds W-2 and W-3 is optional.

After the parts have been connected in the manner hereinbefore described, the cap member 23 may be deformed inwardly to the configuration shown in FIG. 2 which operation will result in the formation of a part hemispheric portion 30 having a narrowed central gas port 31. The gas charging fitting 24 may be connected as by weld 32 to the gas charging port 31 completing the assembly of the accumulator device.

When the completed accumulator is under pressure, the portions of the welds W-2 and W-3 bonded to the exterior wall 29 of the pressure vessel and the inner wall surface 26 of the cap 23 will be sujected to shearing forces and the portions of the welds W-2 and W-3 bonded to the end 13 of the pressure vessel and the end 28 of the cap 23 will be subjected to tension forces. The effectiveness of the retention areas subjected to tension forces to prevent separation of the cap from the pressure vessel is far greater than the effectiveness of the retention areas subjected to shearing forces. Accordingly, an accumulator of the type having a cap secured by two welds to a shell or pressure vessel can withstand far higher pressure before separation of the cap from the shell than an accumulator of the same type with but a single weld to hold the cap and the shell together.

Figure 3:
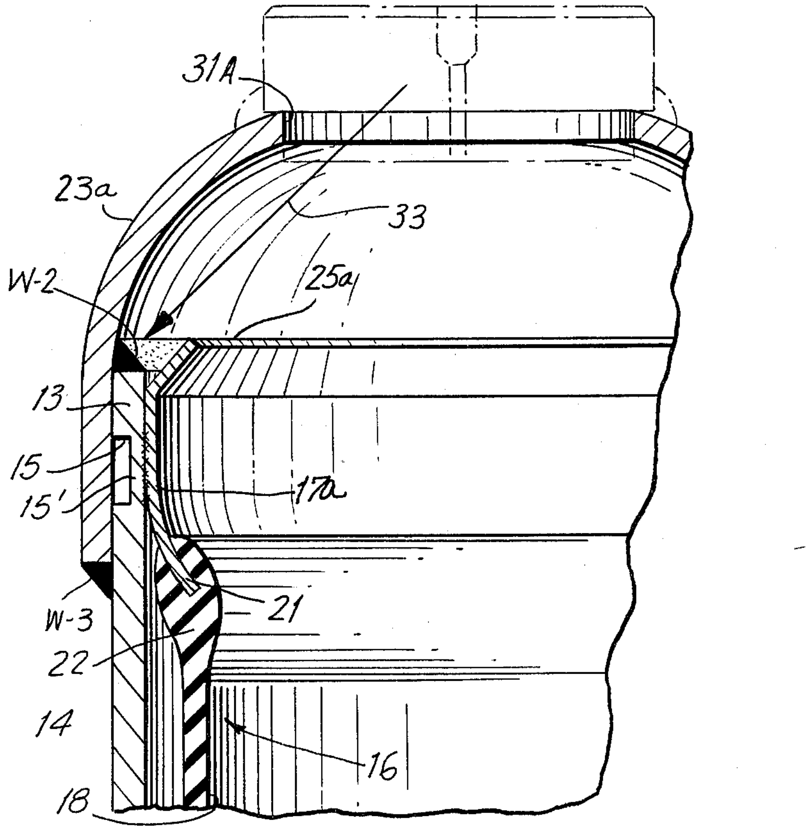
FIG. 3 is a fragmentary vertical section similar to the section of FIG. 2 of a further embodiment of the invention.

In the embodiment of FIG. 3 wherein like parts have been given like reference numerals, the sole differences between the first described embodiment resides in the fact that the cap member 23a has already been preformed to its part spherical configuration. The cap member 23a includes a gas charging port 31A of relatively large diameter. Additionally, the uppermost end 25a of the skirt 17a is inclined upwardly and radially inwardly toward the gas charging port.

By providing the components in the configurations noted, it is possible with the embodiment of FIG. 3 to effect the weld W-2 by inserting a welding rod through the gas charging port 31A in the direction illustrated by the arrow 33. The bent or inclined configuration of the upper portion 25a of the skirt provides additional clearance for insertion of the welding mechanism.

As will be apparent to those skilled in the art numerous variations in the described construction and sequence of method steps may be made without deparing from the spirit of the invention. Accordingly, the same is to be broadly construed within the scope of the appended claims.

Having thus described the invention and illustrated its use, what is claimed as new and is desired to be secured by Letters Patent is:

1. An accumulator device comprising a pressure vessel including a closed end having an oil port and an open end, said open end terminating in an upwardly directed edge portion, a bladder subassembly mounted in said open end, said sub-assembly including an axially elongated metallic mounting skirt having a bladder fixedly secured to one end thereof, said mounting skirt being disposed within said vessel with said one end nearest said closed end of said vessel, at least a portion of the outer wall portion of said skirt intimately engaging the inner wall portion of said vessel adjacent said open end, said skirt including an upper end portion extending above said open end of said vessel, a cap member having an opening for the reception of a gas charging valve, said cap member being positioned in closing relation of said open end, said cap member including a depending skirt outwardly lapping said open end, said cap member including a downwardly directed edge portion, said upper end portion of said skirt, edge portion of said vessel, and inner wall portion of said cap member together defining an annular trough, a first continuous annular weld connection formed between said mounting skirt and said vessel at engaging portions thereof, a second continuous annular weld connection received within said annular trough and connecting said edge portion and the inner wall portion of said cap member and a third continuous annular weld connection formed between said edge portion of said cap member and outer wall portion of said vessel.

2. An accumulator device in accordance with claim 1 wherein said upper edge portion of said mounting skirt is inclined upwardly and radially inwardly toward said opening in said cap, thereby to expose said edge portion through said opening in said cap member to thus enable said second weld connection to be effected by a welding rod inserted through said opening.

3. An accumulator device in accordance with claim 1 wherein said first weld connection comprises a resistance weld, said vessel including on its outer surface a reduced thickness portion corresponding in wall thickness to that of said skirt and in registry with said first weld connection.

4. An accumulator device in accordance with claim 1 wherein said cap member is roll formed inwardly to define said opening, said roll forming being effected after formation of said first, second and third weld connections.

* * * * *